United States Patent
Pogash et al.

(10) Patent No.: US 10,476,198 B1
(45) Date of Patent: Nov. 12, 2019

(54) RECEPTACLE CAGE FOR STACKED CABLED RECEPTACLE CONNECTORS

(71) Applicant: TE CONNECTIVITY CORPORATION, Berwyn, PA (US)

(72) Inventors: Christopher Michael Pogash, Harrisburg, PA (US); Dustin Grant Rowe, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 16/048,558

(22) Filed: Jul. 30, 2018

(51) Int. Cl.
| | | |
|---|---|---|
| *H01R 13/659* | (2011.01) | |
| *H01R 13/518* | (2006.01) | |
| *H01R 13/6587* | (2011.01) | |
| *G02B 6/42* | (2006.01) | |
| *H01R 13/6582* | (2011.01) | |
| *H01R 13/6594* | (2011.01) | |

(52) U.S. Cl.
CPC ......... *H01R 13/518* (2013.01); *H01R 13/659* (2013.01); *H01R 13/6587* (2013.01); *G02B 6/4261* (2013.01); *G02B 6/4277* (2013.01); *H01R 13/6582* (2013.01); *H01R 13/6594* (2013.01)

(58) Field of Classification Search
CPC .............. H01R 13/659; H01R 13/6582; H01R 13/6594; G02B 6/4277; G02B 6/4261
See application file for complete search history.

(56) References Cited

U.S. PATENT DOCUMENTS

| | | | |
|---|---|---|---|
| 6,872,094 B1 | 3/2005 | Murr et al. | |
| 8,182,291 B2 * | 5/2012 | Tsou | H01R 43/18 439/607.55 |
| 9,673,570 B2 | 6/2017 | Briant et al. | |
| 9,705,258 B2 * | 7/2017 | Phillips | H01R 13/6581 |
| 10,114,182 B2 * | 10/2018 | Zbinden | G02B 6/4268 |

* cited by examiner

*Primary Examiner* — Tho D Ta

(57) ABSTRACT

A receptacle cage includes walls defining a cavity including a top wall and first and second side walls extending from the top wall to a bottom. The cavity is open at a rear to receive cabled receptacle connectors and open at a front to receive pluggable modules. A divider wall extends between the side walls and divides the cavity into upper and lower module channels receiving corresponding pluggable modules. The divider wall includes a front and a rear and has mounting fingers proximate to the rear for removably mounting the rear of the divider wall to the side walls.

17 Claims, 3 Drawing Sheets

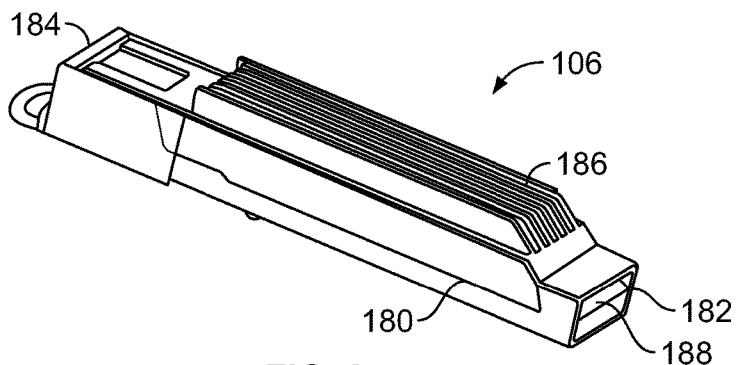
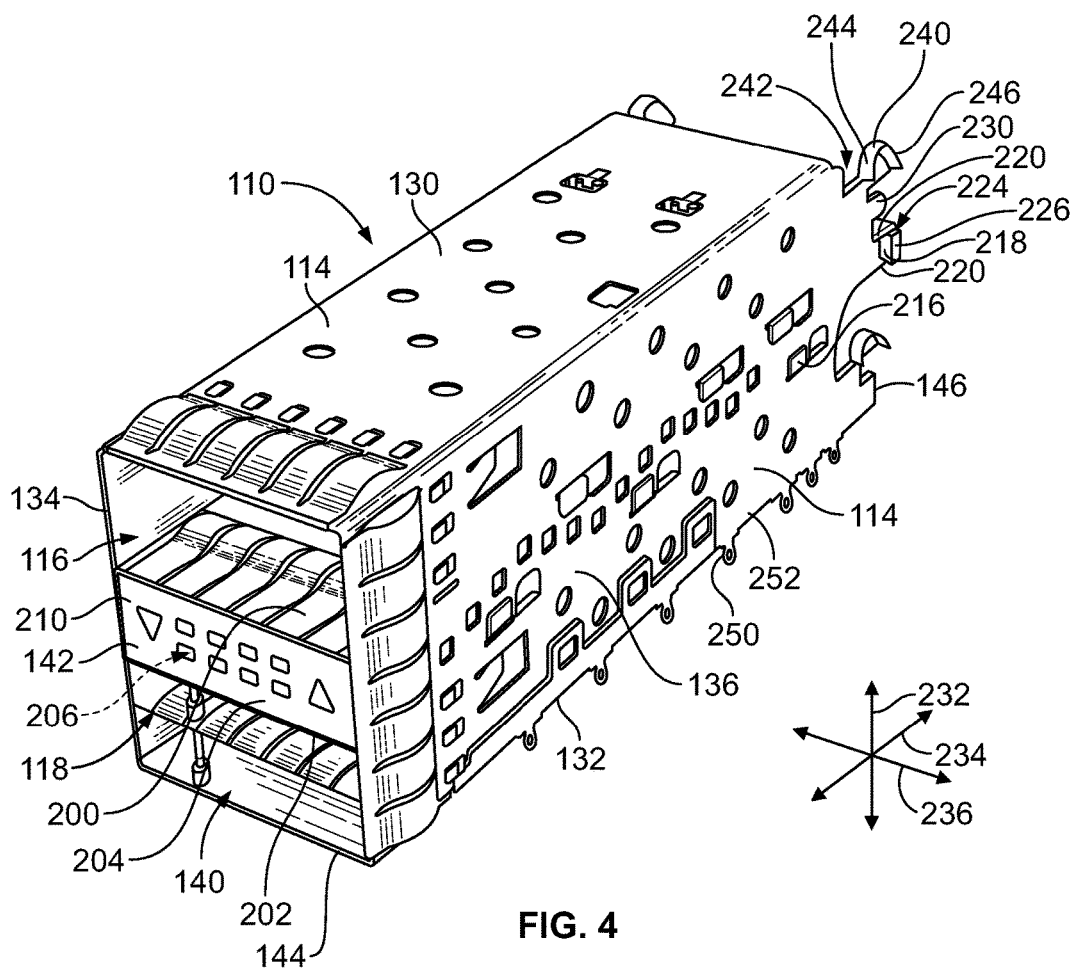

RECEPTACLE CAGE FOR STACKED CABLED RECEPTACLE CONNECTORS

BACKGROUND OF THE INVENTION

The subject matter herein relates generally to communication systems and receptacle cages for communication systems.

Communication systems are known to have receptacle cages mounted to host circuit boards. The communication systems typically include a board mounted receptacle connector mounted directly to the host circuit board within a receptacle cage. The receptacle connector has contacts including mating ends defining a mating interface for mating with pluggable modules and terminating ends that are terminated directly to the host circuit board. Signal paths are defined from the pluggable modules to the host circuit board through the signal contacts of the receptacle connectors. However, with stacked receptacle connectors, the signal contacts associated with the upper module channel mated with the upper pluggable module have longer signal path lengths than the signal contacts associated with the lower module channel mated with, the lower pluggable module. The board mounted, stacked receptacle connectors suffer from problems with electrical skew. Additionally, the electrical signal paths through the host circuit board to another electrical component may be relatively long leading to problems with signal loss along the electrical signal paths.

Some known communication systems utilize receptacle connectors having cables terminated to the signal contacts rather than terminating the signal contacts directly to a host circuit board. However, incorporating such cabled receptacle connectors into a receptacle cage is problematic. Removal and/or replacement of such cabled receptacle connectors is problematic.

A need remains for a receptacle cage for a communication system that removably receives cabled receptacle connectors.

BRIEF DESCRIPTION OF THE INVENTION

In one embodiment, a receptacle cage is provided for a receptacle assembly of a communication system including a plurality of walls defining a cavity extending between a front and a rear of the receptacle cage. The plurality of walls includes a top wall, a first side wall extending from the top wall to a bottom of the receptacle cage and a second side wall extending from the top wall to the bottom. The cavity is open at the rear to receive cabled receptacle connectors at the rear of the receptacle cage, and the cavity is open at the front to receive pluggable modules therein for mating with the corresponding cabled receptacle connectors. Optionally, the first side wall has latching features for latchably securing the cabled receptacle connectors to the first side wall proximate to the rear and the second side wall has latching features for latchably securing the cabled receptacle connectors to the second sidewall proximate to the rear. The receptacle cage includes a divider wall in the cavity extending between the first side wall and the second side wall. The divider wall divides the cavity into an upper module channel between the divider wall and the top wall and a lower module channel between the divider wall and the bottom of the receptacle cage. The upper module channel is configured to receive a corresponding pluggable module, and the lower module channel is configured to receive a corresponding pluggable module. The divider wall includes a front proximate to the front of the receptacle cage and a rear proximate to the rear of the receptacle cage. The divider wall has a first mounting finger proximate to the rear of the divider wall for removably mounting the rear of the divider wall to the first side wall.

In another embodiment, a receptacle cage is provided for a receptacle assembly of a communication system including a plurality of walls defining a cavity extending between a front and a rear of the receptacle cage. The plurality of walls includes a top wall, a first side wall extending from the top wall to a bottom of the receptacle cage and a second side wall extending from the top wall to the bottom. The cavity is open at the rear to receive an upper cabled receptacle connector and a lower cabled receptacle connector at the rear of the receptacle cage and the cavity is open at the front to receive an upper pluggable module and a lower pluggable module therein for mating with the upper cabled receptacle connector and the lower cabled receptacle connector, respectively. The first side wall has an upper latching feature including an upper latch pocket for latchably securing the upper cabled receptacle connector to the first side wall and a lower latching feature including a lower latch pocket for latchably securing the lower cabled receptacle connector to the first side wall. A divider wall in the cavity extends between the first side wall and the second side wall. The divider wall divides the cavity into an upper module channel between the divider wall and the top wall and a lower module channel between the divider wall and the bottom of the receptacle cage. The upper module channel is configured to receive the upper cabled receptacle connector, and the upper pluggable module and the lower module channel is configured to receive the lower cabled receptacle connector and the lower pluggable module. The divider wall includes a front proximate to the front of the receptacle cage and a rear proximate to the rear of the receptacle cage. The rear of the divider wall is configured to block the lower cabled receptacle connector in the lower latch pocket to retain the lower cable receptacle connector in the lower latch pocket.

In a further embodiment, a receptacle assembly is provided for a communication system including a cabled receptacle connector and a receptacle cage. The cabled receptacle connector includes a housing having a cable end and a mating end having a card slot. The house holds contacts extending between mating ends and terminating ends with the mating ends of the contacts provided at the card slot of the house for mating with a pluggable module mated with the cable receptacle connector. The terminating ends are terminated to corresponding one or more cables extending from the cable end of the cabled receptacle connector. The housing has a latching feature extending therefrom and an alignment feature. The receptacle cage is mountable to a substrate and is configured to receive the pluggable module. The receptacle cage has a plurality of walls defining a cavity extending between a front and a rear of the receptacle cage. The plurality of walls includes a top wall, a first side wall extending from the top wall to a bottom of the receptacle cage, and a second side wall extending from the top wall to the bottom. The cavity is open at the rear to receive the cabled receptacle connector at the rear of the receptacle cage, and the cavity is open at the front to receive the pluggable module therein for mating with the cabled receptacle connector. The first side wall has a latching feature latchably and separably interfacing with the latching feature of the cabled receptacle connector. The first side wall has an alignment slot removably receiving the alignment feature of the cable receptacle connector to align the cable receptacle connector in the cavity at the rear. The cabled receptacle connector is removably received in the receptacle cage through the rear of the receptacle cage such that the mating end of the cabled receptacle connector is located in the cavity for mating with the pluggable module.

BRIEF DESCRIPTION OF THE DRAWINGS

FIG. 3 is a rear perspective view of a pluggable module of the communication system in accordance with an exemplary embodiment.

FIG. 4 is a front perspective view of a receptacle cage of the communication system in accordance with an exemplary embodiment.

DETAILED DESCRIPTION OF THE INVENTION

Various embodiments described herein include a receptacle cage for a receptacle assembly of a communication system, such as for an input/output (I/O) module. The receptacle cage may be configured for a quad small form-factor pluggable (QSFP), a small form-factor pluggable (SFP), and the like. In various embodiments, the receptacle cage includes an opening positioned at a rear of the receptacle cage to allow for a direct-attached, cabled receptacle connector to be loaded therein at the rear and an opening positioned at a front of the receptacle cage to receive a pluggable module for mating with the corresponding cabled receptacle connector. The cabled receptacle connector is mounted directly to the receptacle cage. The cabled receptacle connectors in the receptacle cage are configured to be coupled directly to another component via the cable rather than being terminated to a host circuit board, as is common with conventional receptacle assemblies, which improves signal loss and improves skew by transmitting the signals via cables versus standard, board mounted receptacle connectors. In various embodiments, the receptacle cage includes a cage divider that is able to be disengaged and movable relative to the outer cage walls such that the divider wall is able to be lifted up to allow ease of loading and unloading the cabled receptacle connectors, such as into the bottom receptacle. In various embodiments, the divider wall is configured to function as a support for the pluggable module and/or the cabled receptacle connector in the upper receptacle.

Figure 1:
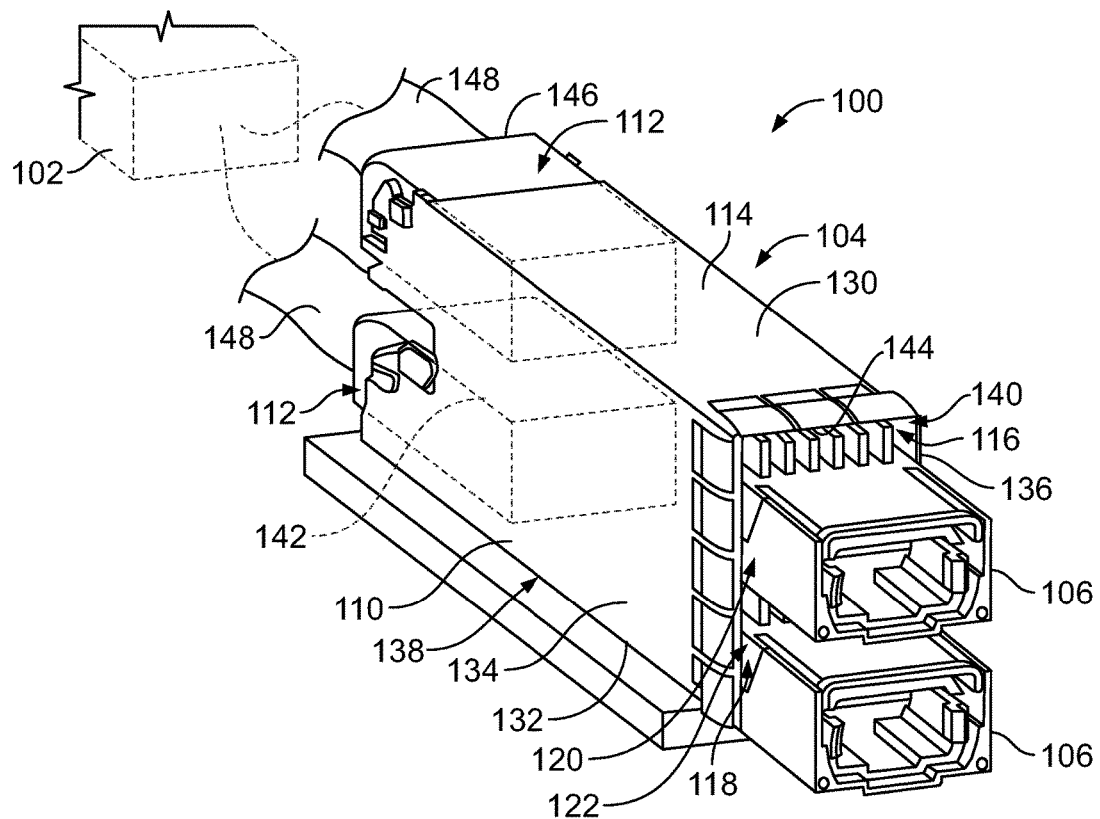
FIG. 1 is a front perspective view of a communication system formed in accordance with an exemplary embodiment.

FIG. 1 is a front perspective view of a communication system 100 formed in accordance with an exemplary embodiment. The communication system 100 includes an electrical component 102 and a receptacle assembly 104 electrically connected to the electrical component 102. The electical component 102 may be located remote from the receptacle assembly 104, such as behind the receptacle assembly 104. The receptacle assembly 104 is electrically connected to the electrical component 102 via cables. Pluggable modules 106 are configured to be electrically connected to the receptacle assembly 104. The pluggable modules 106 are electrically connected to the electrical component 102 through the receptacle assembly 104.

In various embodiments, the electrical component 102 includes an electrical connector. The electrical component 102 may include a circuit board. In various embodiments, rather than being located behind the receptacle assembly 104, the electrical component 102 may be located below the receptacle assembly 104. For example, the receptacle assembly 104 may be mounted on the electrical component 102. Optionally, the receptacle assembly 104 may be moutned to the circuit board of the electrical component 102; however, the signals of the receptacle assembly 104 may be electrically connected to the circuit board of the electrical component 102 via the cables rather than a direct, board mounted electrical connection.

In an exemplary embodiment, the receptacle assembly 104 includes a receptacle cage 110 and one or more cabled receptacle connectors 112 received in the receptacle cage 110 for mating with the corresponding pluggable modules 106. Optionally, a portion of the cabled receptacle connector 112 may extend from or be located rearward of the receptacle cage 110. In various embodiments, the receptacle cage 110 is enclosed and provides electrical shielding for the cabled receptacle connector 112. The pluggable modules 106 are loaded into the receptacle cage 110 and are at least partially surrounded by the receptacle cage 110. In an exemplary embodiment, the receptacle cage 110 is a shielding, stamped and formed cage member that includes a plurality of shielding walls 114 that define one or more module channels for receipt of corresponding pluggable modules 106. In other embodiments, the receptacle cage 110 may be open between frame members to provide cooling airflow for the pluggable modules 106 with the frame members of the receptacle cage 110 defining guide tracks for guiding loading of the pluggable modules 106 into the receptacle cage 110.

In the illustrated embodiment, the receptacle cage 110 constitutes a stacked cage member having an upper module channel 116 and a lower module channel 118. The upper module channel 116 receives an upper cabled receptacle connector 112 therein. The lower module channel 118 receives either a lower cabled receptacle connector 112 therein or a board mounted receptacle connector (not shown) therein. The receptacle cage 110 has upper and lower module ports 120, 122 that open to the module channels 116, 118 that receive corresponding upper and lower pluggable modules 106. Any number of module channels may be provided in various embodiments. In the illustrated embodiment, the receptacle cage 110 includes the upper and lower module channels 116, 118 arranged in a single column, however, the receptacle cage 110 may include multiple columns of ganged module channels 116, 118 in alternative embodiments (for example, 2×2, 3×2, 4×2, 4×3, etc.). The upper and lower cabled receptacle connectors 112 are separately loaded into and unloaded from the module channels 116, 118.

In an exemplary embodiment, the walls 114 of the receptacle cage 110 include a top wall 130, a bottom wall 132, a first sidewall 134 and a second sidewall 136. The first and second side walls 134, 136 extend from the top wall 130 to a bottom 138 of the receptacle cage 110, such as to the bottom wall 132. However, in other various embodiments, the receptacle cage 110 is provided without the bottom wall 132 and the sidewalls 134, 136 may be mounted to another component, such as a substrate or circuit board. In various embodiments, the bottom wall 132 may rest on another component, such as a substrate or circuit board. Optionally, the bottom wall 132 may be mounted to the electrical component 102. However, in alternative embodiments, the bottom wall 132 may be elevated a distance above the substrate or electrical component 102, thus defining a gap below the bottom wall 132, such as for airflow. Optionally, the walls 114 of the receptacle cage 110 may include a rear wall and/or a front wall.

The walls 114 define a cavity 140. For example, the cavity 140 may be defined by the top wall 130, the bottom wall 132, and the sidewalls 134, 136. Other walls 114 may separate or divide the cavity 140 into the various module channels 116, 118. For example, the walls 114 may include a divider wall 142 between the upper and lower module channels 116, 118. The divider wall 142 may be formed from one or more divider panels between the upper and lower module channels 116, 118. The divider panels may form a space between the upper and lower module channels 116, 118, such as for airflow, for a heat sink, for routing light pipes, or for other purposes.

In an exemplary embodiment, the receptacle cage 110 may include one or more gaskets at a front 144 for providing electrical shielding for the module channels 116, 118. For example, the gaskets may be configured to electrically connect with the pluggable modules 106 received in the corresponding module channels 116, 118. The gaskets may be provided at the module ports 120, 122. The gaskets may be configured to electrically connect with a bezel or other panel at the front 144. For example, the receptacle cage 110 may be received in a bezel opening of a bezel and the gasket may electrically connect to the bezel within the bezel opening.

In an exemplary embodiment, the receptacle assembly 104 may include one or more heat sinks (not shown) for dissipating heat from the pluggable modules 106. For example, the heat sink may be coupled to the top wall 130 for engaging the upper pluggable module 106 received in the upper module channel 116. The heat sink may extend through an opening in the top wall 130 to directly engage the pluggable module 106. Other types of heat sinks may be provided in alternative embodiments. Optionally, the receptacle assembly 104 may include one or more heat sinks for engaging the lower pluggable module 106 in the lower module channel 118. For example, the lower heat sink may be provided in the divider wall 142 between the upper and lower module channels 116, 118 or may be provided below the bottom wall 132.

In an exemplary embodiment, the cabled receptacle connectors 112 are received in the cavity 140, such as at a rear 146 of the receptacle cage 110. The cabled receptacle connector 112 are positioned in the cavity 140 to interface with the pluggable module(s) 106 when loaded therein. In an exemplary embodiment, each cabled receptacle connector 112 is used to electrically connect with the pluggable module 106 in the corresponding upper and lower module channels 116, 118.

In an exemplary embodiment, the pluggable modules 106 are loaded through the front 144 to mate with the cabled receptacle connector 112. The shielding walls 114 of the receptacle cage 110 provide electrical shielding around the cabled receptacle connector 112 and the pluggable modules 106, such as around the mating interfaces between the cabled receptacle connector 112 and the pluggable modules 106. The cabled receptacle connector 112 is electrically connected to the electrical component 102 via cables 148 extending rearward from the cabled receptacle connector 112. The cables 148 are routed to the electrical component 102, such as behind the receptacle cage 110 and/or below the receptacle cage 110.

Figure 2:
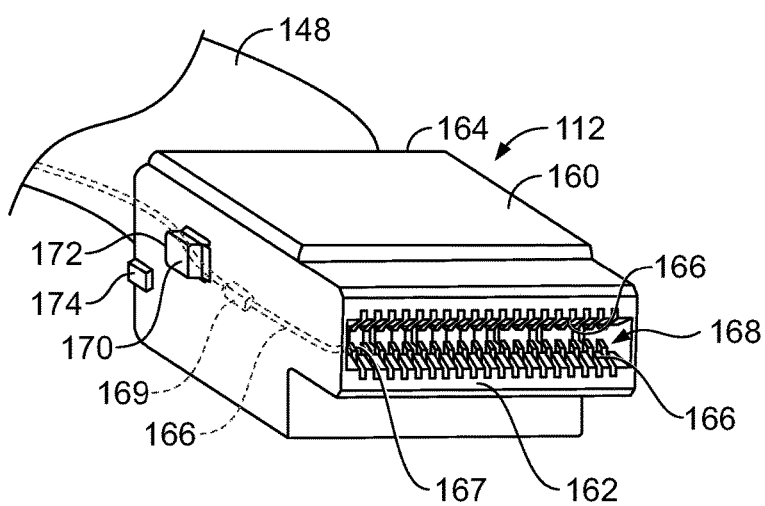
FIG. 2 is a front perspective view of a cabled receptacle connector of the comunicaiton system in accordance with an exemplary embodiment.

FIG. 2 is a front perspective view of the cabled receptacle connector 112 in accordance with an exemplary embodiment. The cabled receptacle connector 112 includes a housing 160 having a mating end 162 and a cable end 164. The housing 160 holds contacts 166 (shown in phantom) configured to be electrically connected to the pluggable module 106. The contacts 166 are electrically connected to the cable 148. In an exemplary embodiment, the housing 160 has a card slot 168 at the mating end 162. The card slot 168 is configured to receive a portion of the pluggable module 106 for electrically connecting the cabled receptacle connector 112 to the pluggable module 106. The contacts 166 are provided at the card slot 168 for interfacing with the pluggable module 106.

In an exemplary embodiment, each contact 166 extends between a mating end 167 and a terminating end 169. The mating end 167 is provided at the card slot 168 for mating with the pluggable module 106. The terminating end 169 is terminated to the cable 148, such as to a wire of the cable 148. The wire may be soldered to the terminating end 169 or may be terminated by other means, such as a crimp connection, an insulation displacement connection, or another type of termination. The contacts 166 may be signal contacts, ground contacts, power contacts or other types of contacts.

In an exemplary embodiment, the housing 160 includes latches 170 for securing the cabled receptacle connector 112 to the receptacle cage 110. Each latch 170 includes a latching surface 172 configured to latchably engage the receptacle cage 110. In the illustrated embodiment, the latches 170 are posts or ribs extending from the opposite sides of the housing 160. Other types of latches 170 may be used in alternative embodiments. For example, the latches 170 may include clips or fasteners in other various embodiments. Optionally, the latches 170 may be deflectable latches.

In an exemplary embodiment, the housing 160 includes alignment features 174 for aligning the cabled receptacle connector 112 to the receptacle cage 110. In the illustrated embodiment, the alignment features 174 are tabs extending from the opposite sides of the housing 160. Other types of alignment features 174 may be used in alternative embodiments. For example, the alignment features may be slots or channels formed in the housing 160. The alignment features 174 may be provided on other surfaces of the housing 160 in alternative embodiments.

FIG. 3 is a rear perspective view of the pluggable module 106 in accordance with an exemplary embodiment. The pluggable module 106 has a pluggable body 180, which may be defined by one or more shells. The pluggable body may be thermally conductive and/or may be electrically conductive, such as to provide EMI shielding for the pluggable module 106. The pluggable body 180 includes a mating end 182 and an opposite front end 184. The mating end 182 is configured to be inserted into the corresponding module channel 116 or 118 (shown in FIG. 1). The front end 184 may be a cable end having a cable extending therefrom to another component within the system.

The pluggable module 106 includes a module circuit board 188 that is configured to be communicatively coupled to the cabled receptacle connector 112 (shown in FIG. 1). The module circuit board 188 may be accessible at the mating end 182. The module circuit board 188 may include components, circuits and the like used for operating and or using the pluggable module 106. For example, the module circuit board 188 may have conductors, traces, pads, electronics, sensors, controllers, switches, inputs, outputs, and the like associated with the module circuit board 188, which may be mounted to the module circuit board 188, to form various circuits.

The pluggable module 106 includes an outer perimeter defining an exterior of the pluggable body 180. The exterior extends between the mating end 182 and the front end 184 of the pluggable module 106. In an exemplary embodiment, the pluggable body 180 provides heat transfer for the module circuit board 188, such as for the electronic components on the module circuit board 188. For example, the module circuit board 188 is in thermal communication with the pluggable body 180 and the pluggable body 180 transfers heat from the module circuit board 188. In an exemplary embodiment, the pluggable body 180 includes a plurality of heat transfer fins 186 along at least a portion of the outer perimeter of the pluggable module 106. The fins 186 transfer heat away from the main shell of the pluggable body 180, and thus from the module circuit board 188 and associated components. The fins 186 are separated by gaps that allow airflow or other cooling flow along the surfaces of the fins 186 to dissipate the heat therefrom. In the illustrated embodiment, the fins 186 are parallel plates that extend lengthwise; however the fins 186 may have other shapes in alternative embodiments, such as cylindrical or other shaped posts.

Figure 5:
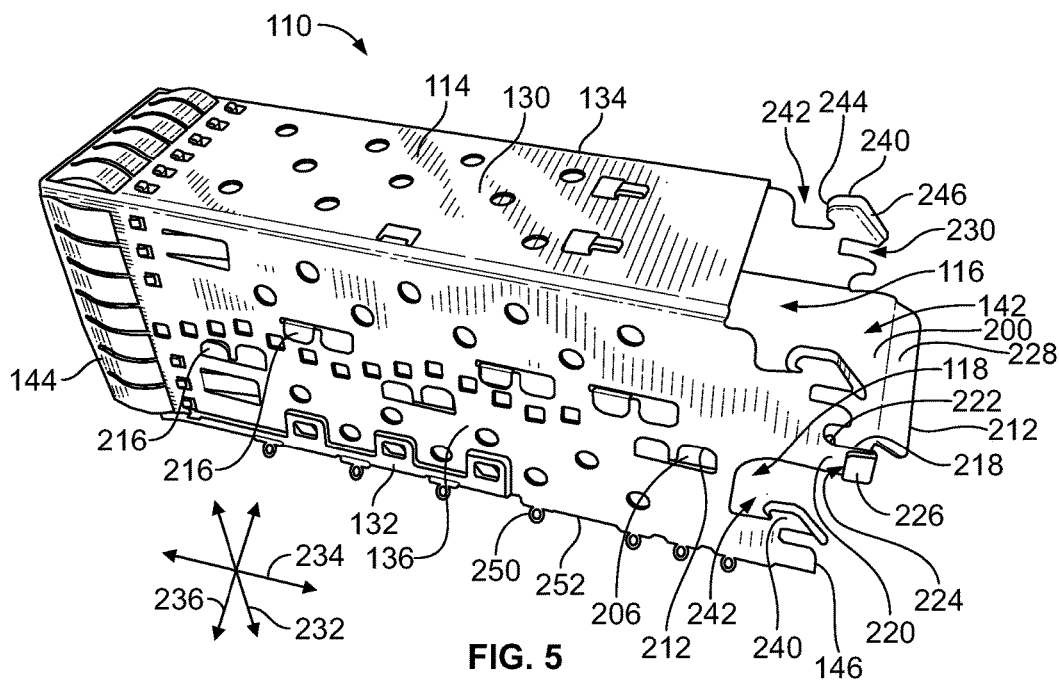
FIG. 5 is a rear perspective view of the receptacle cage in accordance with an exempalry embodiment showing a divider wall of the receptacle cage in a lowered position.
Figure 6:
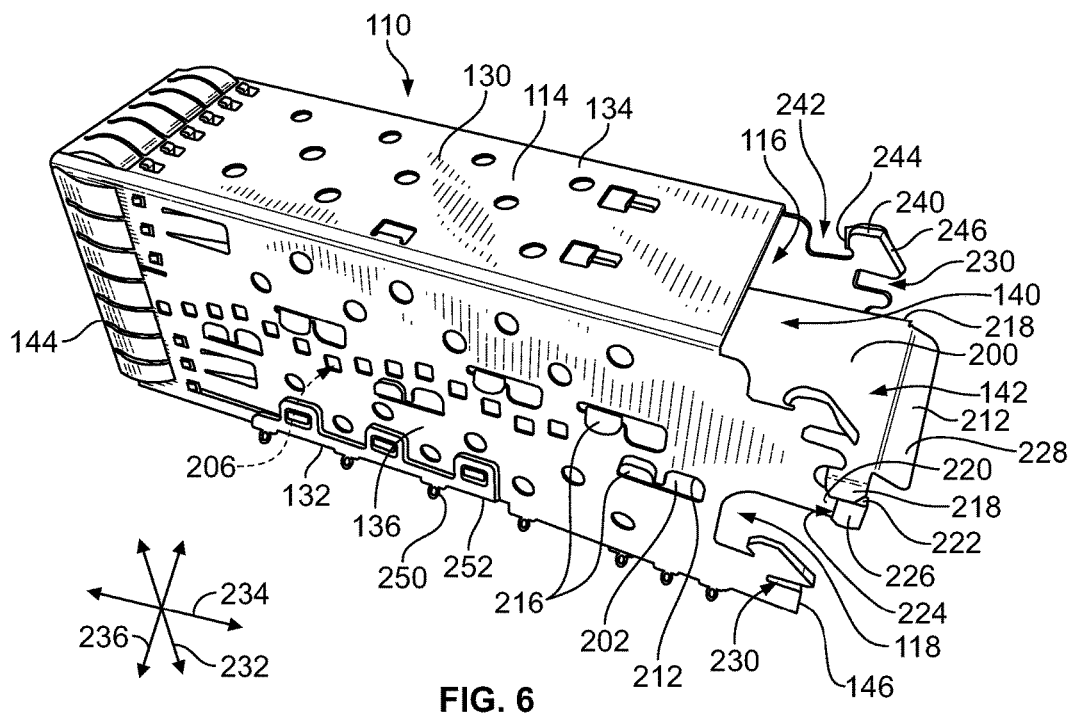
FIG. 6 is a rear perspective view of the receptacle cage in accordance with an exempalry embodiment showing the divider wall in an elevated and disengaged position.

FIG. 4 is a front perspective view of the receptacle cage 110 in accordance with an exemplary embodiment. FIG. 5 is a rear perspective view of the receptacle cage 110 in accordance with an exempalry embodiment showing the divider wall 142 in a lowered and mated position. FIG. 6 is a rear perspective view of the receptacle cage 110 in accordance with an exempalry embodiment showing the divider wall 142 in an elevated and disengaged position. The receptacle cage 110 includes the divider wall 142 between the upper and lower module channels 116, 118. The divider wall 142 separates the upper module channel 116 from the lower module channel 118. In an exemplary embodiment, the divider wall 142 includes an upper divider panel 200, a lower divider panel 202 and a front panel 204 between the upper divider panel 200 and the lower divider panel 202. The divider wall 142 includes a space 206 between the upper divider panel 200 and the lower divider panel 202. In other various embodiments, the divider wall 142 may be formed from a single panel between the upper and lower module channels 116, 118 rather than the upper and lower divider panels 200, 202.

The divider wall 142 extends between a front 210 (shown in FIG. 4) and a rear 212 (shown in FIGS. 5 and 6). The front 210 of the divider wall 142 is configured to be located at or proximate to the front 144 of the receptacle cage 110. The rear 212 of the divider wall 142 is configured to be located at or proximate to the rear 146 of the receptacle cage 110. In an exemplary embodiment, the upper and lower divider panels 200, 202 extend parallel to the top wall 130 and the bottom wall 132. The upper module channel 116 is defined between the top wall 130 and the upper divider panel 200. The lower module channel 118 is defined between the bottom wall 132 and the lower divider panel 202.

The divider wall 142 is configured to separate and provide electrical shielding between the upper cabled receptacle connector 112 (e.g., within the upper module channel 116) and the lower cabled receptacle connector 112, or the lower board mounted receptacle connector, (e.g., within the lower module channel 118). The divider wall 142 is configured to separate and provide electrical shielding between the upper pluggable module 106 and the lower pluggable module 106.

In the illustrated embodiment, the upper divider panel 200 is longer than the lower divider panel 202. For example, the rear 212 of the upper divider panel 200 may extend further rearward than the rear 212 of the lower divider panel 202. Optionally, the rear 212 of the upper divider panel 200 may extend to or beyond the rear 146 of the receptacle cage 110, whereas the rear 212 of the lower divider panel 202 may stop short of the rear 146 of the receptacle cage 110. For example, the edge of the rear 212 of the lower divider panel 202 may be located proximate to the mating interface and between the pluggable module 106 and the cables receptacle connector 112.

The divider wall 142 includes mounting fingers 216 for mounting the divider wall 142 to the walls 114 of the receptacle cage 110. For example, the mounting fingers 216 may be coupled to the first and second side walls 134, 136. The mounting fingers 216 may be received in pockets or grooves formed in the first and second side walls 134, 136. In the illustrated embodiment, the mounting fingers 216 are formed by tabs or flaps bent or folded from the upper divider panel 200 and/or the lower divider panel 202. For example, the tabs or flaps may be bent at 90° to form the mounting fingers 216. The mounting fingers 216 may be located at multiple locations along the the sides of the divider wall 142.

In an exemplary embodiment, the rearward most mounting fingers 216 define rear mounting fingers 218 at the opposite sides of the divider wall 142, for example, the upper divider panel 200. The rear mounting fingers 218 are configured to be coupled to the first and second side walls 134, 136. In an exemplary embodiment, the rear mounting fingers 218 are configured to be disengaged from the first and second side walls 134, 136, such as to allow the divider wall 142 (for example, the upper divider panel 200) to be decoupled from the receptacle cage 110. The divider wall 142 is able to be decoupled from receptacle cage 110 to allow the divider wall 142 to be lifted upward. As the divider wall 142 is lifted, the mounting fingers 218 may be disengaged (FIG. 6) from the pockets or grooves of the sidewalls to increase the size of the lower module channel 118, to enable, for example, loading the lower cabled receptacle connector 112 into the lower module channel 118. The mounting fingers 218 may then be reengaged or re-coupled (FIG. 5) to the receptacle cage 110 to properly position the divider wall 142 in the cavity 140. Having the mounting fingers 218 removably mounted to the first and second side walls 134, 136 allows the rear 212 of the divider wall 142 to be disengaged from the first and second side walls 134, 136 for opening up the lower module channel 118 for loading and unloading the cabled receptacle connector 112 into the lower module channel 118. In an exemplary embodiment, when the divider wall 142 is recoupled to the first and second side walls 134, 136, the divider wall 142 supports the upper and lower cabled receptacle connectors 112 in the upper and lower module channels 116, 118. For example, the upper divider panel 200 may support the upper cabled receptacle connector 112 and/or the upper pluggable module 106 in the upper module channel 116. The lower divider panel 202 may retain the lower cabled receptacle connector 112 in the lower module channel 118, such as by blocking the lower cabled receptacle connector 112 from removal from the lower module channel 118.

The divider wall 142 is deflectable between an elevated position (FIG. 6) and a lowered position (FIG. 5). When the mounting fingers 218 are disengaged from the first and second side walls 134, 136, the divider wall 142 may be moved to the elevated position. For example, the upper divider panel 200 may be lifted upward to disengage the mounting fingers 218 from the first and second sidewalls 134, 136. The divider wall 142 may be moved to the lowered position to reengage the mounting fingers 218 with the first and second side walls 134, 136.

Optionally, the divider wall 142 includes a ramp 228 at the rear 212 of the divider wall 142 (for example, at the rear 212 of the upper divider panel 200). In the illustrated embodiment, the ramp 228 is upward sloped. The ramp 228 may be used to guide loading of the cabled receptacle connector 112 into the upper module channel 116. Optionally, the lower divider panel 202 may include a similar ramp for guiding the lower cabled receptacle connector 112 into the lower module channel 118, such ramp being downward sloped.

In an exemplary embodiment, the sidewalls 134, 136 include support arms 220 at or proximate to the rear 146 of the receptacle cage 110. The support arms 220 support the mounting fingers 218. In an exemplary embodiment, the support arm 220 includes a support surface 222, such as along the top surface of the support arm 220. The support surface 222 supports the divider wall 142. For example, the support surface 222 may support the mounting finger 218 and/or the upper divider panel 200. In an exemplary embodiment, the support arm 220 includes a pocket 224 that receives and/or captures the mounting finger 218 therein. In the illustrated embodiment, the pocket 224 is formed by wrapping a tab 226 around to form the pocket 224. The mounting finger 218 is configured to be captured in the pocket 224 between the tab 226 and the support arm 220.

In an exemplary embodiment, the sidewalls 134, 136 include alignment features 230 for aligning the cabled receptacle connectors 112 in the upper and lower module channels 116, 118. In the illustrated embodiment, the alignment features 230 are defined by alignment slots 230 formed in the sidewalls 134, 136 at the rear 146. The alignment features 230 interface with the alignment features 174 (shown in FIG. 2) of the cabled receptacle connector 112. Other types of alignment features 230 may be provided in alternative embodiments. The alignment features 230 may be used to align the cabled receptacle connector 112 along an elevation axis 232, a longitudinal axis 234 and/or a lateral axis 236.

In an exemplary embodiment, the sidewalls 134, 136 include latching features 240 for securing the cabled receptacle connectors 112 in the upper and lower module channels 116, 118. In the illustrated embodiment, each latching feature 240 includes a latch pocket 242 for receiving the corresponding latch 170 of the cabled receptacle connector 112. Optionally, the latch pocket 242 may be open from above the latch pocket 242 for receiving the latch 170. In other various embodiments, the latch pocket 242 may be a stamped pocket that accepts a deflectable, lateral axis latch. In an exemplary embodiment, each latching feature 240 includes a catch surface 244 for securing the latch 170 in the latch pocket 242. Optionally, the catch surface 244 may be rearward of the latch pocket 242. The latching surface 172 of the latch 170 is configured to engage the catch surface 244 to hold the cabled receptacle connector 112 in the receptacle cage 110. For example, the latching surface 172 blocks rearward removal of the cable receptacle connector 112 from the receptacle cage 110. Rather, the latch 170 must be removed from the latch pocket 242, such as by lifting the cabled receptacle connector 112, and thus the latch 170, upward to clear the catch surface 244. In an exemplary embodiment, each latching feature 240 includes a ramp surface 246 at the rear 146 to guide the latch 170 into the latch pocket 242. The ramp surface 246 may be upward sloped and extend from the rear along the top of the latching feature 240 into the latch pocket 242. As the cabled receptacle connector 112 is rear loaded into the receptacle cage 110, the latch 170 of the cabled receptacle connector 112 may ride along the ramp surface 246 into the latch pocket 242. Other types of latching features 240 may be provided in alternative embodiments for securing the cabled receptacle connector 112 in the receptacle cage 110.

In an exemplary embodiment, the first and second side walls 134, 136 include mounting features 250 and a bottom edge 252 of the corresponding sidewalls 134, 136. The mounting features 250 are configured to be mounted to a substrate, such as a circuit board. The mounting features 250 may be mounted to the electrical component 102 (shown in FIG. 1). In the illustrated embodiment, the mounting features 250 are compliant pins, such as eye of the needle pins configured to be press-fit into the substrate. In an exemplary embodiment, the mounting features 250 mount or secure the first and second side walls 134, 136 to the substrate to permanently secure the receptacle cage 110 to the substrate. In an exemplary embodiment, the cabled receptacle connectors 112 are loadable into the cavity 140 and unloadable from the cavity 140 without removing the first and second side walls 134, 136 from the substrate. The cabled receptacle connectors 112 may be released from the receptacle cage 110, such as by releasing the latches 170 from the latching features 240.

In an exemplary embodiment, the divider wall 142 is configured to be disengaged from the side walls 134, 136 to allow loading and unloading of the lower cabled receptacle connector 112 and the lower module channel 118. For example, when the mounting fingers 218 are released are disengaged from the side walls 134, 136, the upper divider panel 200 may be lifted upward to increase the size of the lower module channel 118, such as to allow the latch 170 to be loaded into the latch pocket 242 or removed from the latch pocket 242. When the upper divider panel 200 is in the lowered position, the lower module channel 118 may be blocked. For example, the divider wall 142 may block the cabled receptacle connector 112 in the lower module channel 118 such that the cabled receptacle connector 112 may only be removed after the divider wall 142 is moved to the elevated position. Optionally, the divider wall 142 may be moved to the elevated position after the upper cabled receptacle connector 112 is removed from the upper module channel 116.

It is understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle cage for a receptacle assembly of a communication system comprising:
a plurality of walls defining a cavity extending between a front and a rear of the receptacle cage, the plurality of walls including a top wall, a first side wall extending from the top wall to a bottom of the receptacle cage and a second side wall extending from the top wall to the bottom, wherein the cavity is open at the rear to receive at least one cabled receptacle connector at the rear of the receptacle cage and the cavity is open at the front to receive pluggable modules therein for mating with the corresponding cabled receptacle connector; and
a divider wall in the cavity extending between the first side wall and the second side wall, the divider wall dividing the cavity into an upper module channel between the divider wall and the top wall and a lower module channel between the divider wall and the bottom of the receptacle cage, the upper module channel configured to receive a corresponding pluggable module, the divider wall including a front proximate to the front of the receptacle cage and a rear proximate to the rear of the receptacle cage, the divider wall having a first mounting finger at the rear of the divider wall for removably mounting the rear of the divider wall to the first side wall, the first side wall includes a support arm at the rear of the receptacle cage supporting the first mounting finger.

2. The receptacle cage of claim 1, wherein the first mounting finger disengages from the first side wall to increase the size of the lower module channel.

3. The receptacle cage of claim 1, wherein the first side wall includes a pocket removably receiving the first mounting finger.

4. The receptacle cage of claim 1, wherein the divider wall includes a second mounting finger at the rear of the divider wall opposite the first mounting finger, the second mounting finger removably mounting the rear of the divider wall to the second side wall.

5. The receptacle cage of claim 1, wherein the divider wall separates and provides electrical shielding between an upper cabled receptacle connector and a lower cabled receptacle connector at the rear of the receptacle cage and separates and provides electrical shielding between an upper pluggable module and a lower pluggable module.

6. The receptacle cage of claim 1, wherein the divider wall is deflectable between an elevated position and a lowered position, the first mounting finger being disengaged from the first side wall in the elevated position to provide greater access to the lower module channel, the first mounting finger engaging the first side wall in the lowered position.

7. The receptacle cage of claim 1, wherein the first side wall includes a latching feature for latchably securing the cabled receptacle connector to the first side wall proximate to the rear of the receptacle, the latching feature includes a catch surface rearward of a latch pocket, the latch pocket configured to receive a latch of the cabled receptacle connector such that the catch surface engages and retains the latch of the cabled receptacle connector in the latch pocket.

8. The receptacle cage of claim 1, wherein the first side wall includes alignment slots configured to receive alignment features of the cabled receptacle connector to align the cabled receptacle connector in the upper module channel.

9. The receptacle cage of claim 1, wherein the first side wall includes mounting features at a bottom edge of the first side wall configured to be mounted to a substrate and the second side wall includes mounting features at a bottom edge of the second side wall configured to be mounted to the substrate, wherein the first and second side walls are configured to be mounted to the substrate prior to loading the cabled receptacle connector into the cavity, and wherein latching features of the first and second side walls are used to latchably secure the cabled receptacle connector in the cavity and are configured to release the cabled receptacle connector without removing the first and second side walls from the substrate.

10. The receptacle cage of claim 9, wherein the divider wall lifts upward to allow the cabled receptacle connector in the lower module channel to release from the lower module channel without removing the first and second side walls from the substrate.

11. A receptacle cage for a receptacle assembly of a communication system comprising:
a plurality of walls defining a cavity extending between a front and a rear of the receptacle cage, the plurality of walls including a top wall, a first side wall extending from the top wall to a bottom of the receptacle cage and a second side wall extending from the top wall to the bottom, wherein the cavity is open at the rear to receive an upper cabled receptacle connector and a lower cabled receptacle connector at the rear of the receptacle cage and the cavity is open at the front to receive an upper pluggable module and a lower pluggable module therein for mating with the upper cabled receptacle connector and the lower cabled receptacle connector, respectively, the first side wall having an upper latching feature at the rear including an upper latch pocket for latchably securing a latch of the upper cabled receptacle connector to the first side wall and a lower latching feature at the rear including a lower latch pocket for latchably securing a latch of the lower cabled receptacle connector to the first side wall; and
a divider wall in the cavity extending between the first side wall and the second side wall, the divider wall dividing the cavity into an upper module channel between the divider wall and the top wall and a lower module channel between the divider wall and the bottom of the receptacle cage, the upper module channel configured to receive the upper cabled receptacle connector and the upper pluggable module, the lower module channel configured to receive the lower cabled receptacle connector and the lower pluggable module, the divider wall including a front proximate to the front of the receptacle cage and a rear proximate to the rear of the receptacle cage, the rear of the divider wall configured to block the lower cabled receptacle connector in the lower module channel to retain the lower cable receptacle connector in the lower module channel when the divider wall is moved from an elevated position to a lowered position.

12. The receptacle cage of claim 11, wherein the divider wall includes a first mounting finger proximate to the rear of the divider wall for removably mounting the rear of the divider wall to the first side wall.

13. The receptacle cage of claim 11, wherein the rear of the divider wall disengages from the first side wall and the second side wall to increase the size of the lower module channel.

14. The receptacle cage of claim 11, the divider wall separates and provides electrical shielding between the upper cabled receptacle connector and the lower cabled receptacle connector at the rear of the receptacle cage and separates and provides electrical shielding between the upper pluggable module and the lower pluggable module.

15. The receptacle cage of claim 11, wherein the divider wall is deflectable between the elevated position and the lowered position, the divider wall including first and second mounting fingers being disengaged from the first side wall and the second side wall, respectively, in the elevated position to provide greater access to the lower module channel, the first and second mounting finger engaging the first side wall and the second side wall, respectively, in the lowered position.

16. The receptacle cage of claim 11, wherein the second side wall includes an upper latching feature including an upper latch pocket for latchably securing a latch of the upper cabled receptacle connector to the second side wall and a lower latching feature including a lower latch pocket for latchably securing a latch of the lower cabled receptacle connector to the second side wall.

17. The receptacle cage of claim 11, wherein the first side wall includes mounting features at a bottom edge of the first side wall configured to be mounted to a substrate and the second side wall includes mounting features at a bottom edge of the second side wall configured to be mounted to the substrate, wherein the first and second side walls are configured to be mounted to the substrate prior to loading the upper and lower cabled receptacle connectors into the upper and lower module channels, and wherein the upper and lower latching features of the first side wall are configured to release the upper and lower cabled receptacle connectors without removing the first side wall from the substrate.

* * * * *